3,060,227
PRODUCTION OF ACRYLIC ACID ESTERS
Robert Stadler, Heidelberg, and Hans Lautenschlager, Ludwigshafen (Rhine), Germany, assignors to Badische Anilin- & Soda-Fabrik Aktiengesellschaft, Ludwigshafen (Rhine), Germany
No Drawing. Continuation of application Ser. No. 714,494, Feb. 11, 1958. This application May 5, 1961, Ser. No. 107,920
Claims priority, application Germany Feb. 23, 1957
8 Claims. (Cl. 260—486)

This invention relates to a process for the production of acrylic acid esters from acetylene, carbon monoxide, and alcohols in the presence of suitable catalysts. The special object of the invention is to provide a further improvement in the acrylic acid esters synthesis according to W. Reppe in which acetylene, carbon monoxide, and lower alcohols are reacted in the presence of carbonyl-forming metals or their compounds at elevated temperatures and under increased pressure.

The halides of carbonyl-forming metals, especially nickel halides, in combination with a copper halide as activator, have proved to be particularly suitable catalysts in the production of acrylic acid esters according to W. Reppe. The catalyst is dissolved or suspended in an inert oxygen-containing organic solvent which is used in excess.

The copending U.S. application Ser. No. 703,506, filed December 18, 1957 by Robert Stadler and Friedrich Becke describes a process for the production of acrylic acid esters in which acetylene and carbon monoxide are reacted with alcohols or phenols at elevated temperature and under increased pressure in the presence of catalytic amounts of a halide of a carbonyl-forming metal and small amounts of a heavy metal, especially a heavy metal halide, as activator, the reaction being carried out in the absence of an organic solvent but in the presence of a compound containing at least one carboxylic group. Among the compounds of that type acrylic acid has proven to be particularly suitable.

We have now found that in the said process for the production of acrylic acid esters from lower aliphatic alcohols particularly satisfactory results can be obtained if acrylic acid which is formed in the course of the reaction from the aqueous reaction medium, is used as the carboxylic group containing compound.

That means that the reaction medium need not contain acrylic acid or another compound containing a carboxylic group from the start. It is quite sufficient if the acrylic acid is formed during the course of the reaction from water which is added to the reaction medium at the beginning of the reaction.

The water may be supplied to the reaction medium either separately or mixed with the alcohol. It is advantageous to use about 4 to 12 percent of water with reference to the amount of the alcohol used. Larger amounts of water, it is true, would promote the formation of acrylic acid, but the formation of esters would be rendered more difficult because the mixed gas, i.e. a mixture of equivalent amounts of acetylene and carbon monoxide, dissolves with greater difficulty as the water content increases. It is an advantage, however, that when using alcohol containing a large amount of water it is not necessary to remove the water previously.

As catalysts there are especially suitable the halides of carbonyl-forming metals, especially nickel halides, for example nickel-(2)-chloride, bromide and iodide, and complex compounds of nickel, as for example nickel acetonyl-acetonate, the nickel bromide-triphenyl phosphine-alkyl bromide complex, and similar compounds. When using nickel acetonyl-acetonate as heavy metal compound it is preferable to add a halide of the heavy metal. There may be used however the carbonyl-forming metals themselves or their halogen-free compounds in admixture with halogen or halogen compounds. These compounds may be dissolved in small amounts of water before they are added to the alcohol. Depending on the nature and amount of the activator added, the amount of catalyst should preferably be from about 0.01 to 1 percent with reference to the amount of alcohol introduced; the usual quantity is between 0.05 and 0.1 percent.

For the activation of the catalyst only very small amounts of a heavy metal or a heavy metal compound are required, for example 3 to 20 percent of the amount of catalyst. Copper and mercury halides, e.g. copper iodide, copper bromide, or other copper compounds, such as copper cyanide or copper acetonyl-acetonate, or mercury iodide, have proved especially effective. Very active catalysts are for example nickel bromide and cuprous iodide.

It is often advantageous to add hydrogen halides, for example HCl or HBr, to the reaction mixture. The hydrogen halide may be added in quantities of about 0.01 to 1 percent with reference to the weight of the alcohol introduced. The amount of the hydrogen halide thus corresponds to the amount of catalyst used. By the addition of hydrogen halide the throughput can be further increased and paler reaction liquids can be obtained.

The activating action of copper is so great, that even minute amounts of copper cause considerable action in the presence of acrylic acid, which is formed in the course of the reaction from the water, which is present in the reaction medium at the beginning of the reaction.

A smaller activation of the catalyst is obtained by the addition of compounds of other heavy metals, especially their halogen compounds. As such there may be used zinc iodide, cadmium iodide, lead iodide or chromium iodide. The simultaneous use for example of cadmium iodide and zinc iodide gives better activation than addition of the said compounds by themselves. Accordingly the copper compound used for activating the catalyst can also be partly replaced by one or more of the other heavy metal compounds mentioned above.

Suitable initial materials for the process according to this invention are monohydric or polyhydric aliphatic alcohols, for example lower aliphatic alcohols containing 1 to 4 carbon atoms, such as methanol, ethanol, propanol, normal butanol, isobutanol or ethylene glycol, glycerine, and the like. When two different alcohols are present at the same time, the corresponding acrylic acid esters are formed side by side. The higher alcohol is thereby preferentially converted into the corresponding acrylic acid ester. Thus for example a mixture of ethyl acrylate and normal butyl acrylate is obtained from a mixture of ethyl alcohol and normal butanol.

The reaction conditions correspond to those usual in the synthesis of acrylic acid esters according to Reppe. The working temperature is between 100 and 250° C. The partial pressure of the acetylene should be above 5 atmospheres, preferably between 10 and 80 atmospheres. The process can be carried out both continuously and discontinuously.

At the beginning of the reaction the temperature should be for example about 10 to 20° C. higher than is necessary in the conventional esterification process, in order to effect an initial acceleration of the formation of acrylic acid. As soon as sufficient acrylic acid has been formed the temperature can be lowered to the usual reaction temperature.

The parts specified in the following examples, which are illustrative rather than limitative, are parts by weight and the percentages specified are percentages by weight unless otherwise stated. Parts by volume are in the same ratio to parts by weight as the liter is to the kilogram.

The term "mixed gas" used in the examples means a gas mixture consisting of equal parts by volume of carbon monoxide and acetylene.

Example 1

100 parts of a solution which contains 3.5 percent of water, 0.4 percent of nickel-2-bromide, and 0.17 percent of copper iodide in normal butanol are placed in a shaking autoclave. The autoclave is rinsed with nitrogen. Then 24 excess atmospheres of the mixture of acetylene and carbon monoxide are forced in and the autoclave is heated. At 200° C. the pressure which has risen to 32 excess atmospheres begins to subside. The temperature of the autoclave is kept at 200 to 210° C. for 2½ hours and the pressure is kept between 60 and 32 excess atmospheres by repeated forcing in of mixed gas.

142 parts of a reaction liquid are obtained from which by distillation there can be isolated 96 parts of butyl acrylate and 3.46 parts of acrylic acid. The distillation residue amounts to 14 percent with reference to the amount of ester.

Example 2

83 parts of normal butanol which contains 12 percent of water, 0.4 percent of nickel-2-bromide, 0.1 percent of cuprous iodide, and 0.2 percent of zinc bromide are placed in a shaking autoclave. 0.1 part of hydroquinone is added as stabilizer for the normal butyl acrylate to be formed. After rinsing with nitrogen and forcing in 24 excess atmospheres of mixed gas the autoclave is heated. The autoclave pressure first rises to 33 excess atmospheres and then falls when a temperature of 195° C. has been reached. The autoclave is kept at a temperature of about 205° C. for three hours and the pressure kept between 39 and 63 excess atmospheres by continuously forcing in of mixed gas. The autoclave contains 136 parts of a reaction liquid with a density of 0.91. By distillation there are obtained 81.5 parts of butyl acrylate and 9.65 parts of acrylic acid. The distillation residue amounts to 17.6 percent of the ester formed.

Example 3

1,420 parts of pure ethyl alcohol, 5.0 parts of nickel-2-bromide, 0.5 part of copper bromide, 175 parts of water, and 1 part of hydroquinone (as stabilizer) are charged into a stirring autoclave of stainless steel. After rinsing with nitrogen, 24 excess atmospheres of mixed gas are forced in and the autoclave is heated to 200° C. while stirring.

The temperature in the autoclave is kept at 200 to 206° C. for 3 hours and the pressure is kept between 45 and 58 excess atmospheres by forcing in mixed gas.

2,640 parts of a pale brown clear liquid without sediment are obtained. By distillation, 1,560 parts (i.e. 59.3 percent) of ethyl acrylate and 167 parts (i.e. 6.3 percent) of acrylic acid can be isolated therefrom. 11.8 percent with reference to the amount of ester remain in the residue.

Example 4

45 atmospheres of mixed gas are forced into a vertical tube of stainless steel having a capacity of 2.8 liters. 450 cubic centimeters per hour of ethyl alcohol containing 12 percent of water in which 0.2 percent of nickel-2-bromide and 0.05 percent of copper-(I)-iodide have been dissolved, are continuously forced in. The reaction chamber is kept at 195° C. 50 normal liters per hour of residual gas are withdrawn in order to avoid accumulation of gaseous byproducts. 610 cubic centimeters of a pale green reaction product are obtained per hour. 200 parts of this product are distilled. At atmospheric pressure nothing passes over up to an internal temperature of 100° C. Then at a pressure of 450 mm. Hg there are obtained between 53 and 56° C. 169 parts of a fraction which contains 53 percent of ethyl acrylate. This fraction contains no acrylic acid. As a second fraction there are obtained 21 parts of a fraction containing 66 percent of acrylic acid and 27 percent of ethyl acrylate, which passes over at a pressure of 12 mm. Hg between 55° and 76° C. 10 parts remain in the residue as a pale brown oil. If into the above described apparatus, in which the reaction for the formation of ethyl acrylate is already proceeding, the ethyl alcoholic contact solution containing 12 percent of water is no longer forced in, but a contact solution which, besides ethanol, contains only 0.5 percent of water, the formation of ethyl acrylate slowly comes to a standstill. After 14 hours the reaction product still contains 0.4 percent of acrylic acid and 26 percent of ethyl acrylate, and after 24 hours no acrylic acid and only 3.6 percent of ethyl acrylate.

Example 5

The procedure of Example 4 is followed with the difference that 300 cubic centimeters per hour of an ethyl alcoholic contact solution containing 22 percent of water is forced continuously into the tube. 410 cubic centimeters per hour of a pale green reaction product are obtained. From 200 parts of this product, by distillation, there are obtained as the fraction 141 parts which pass over between 60 and 65° C. at 450 mm. Hg and contain 55 percent of ethyl acrylate. The second fraction is obtained at a pressure of 28 mm. Hg between 57 and 77° C. and consists of 71 percent of acrylic acid and 19.5 percent of ethyl acrylate. 11.5 parts remain in the residue.

Example 6

A mixture of 0.2 percent of nickel-2-bromide, 0.05 percent of copper-(I)-iodide, and 9 percent of water in normal butanol is continuously reacted at 205° C. and 28 mm. Hg pressure with acetylene and carbon monoxide as described in Example 4. By forcing 350 cubic centimeters of the mixture into the reaction tube per hour, there are obtained 440 cubic centimeters per hour of a pale yellow reaction product. By distillation in vacuo there are obtained therefrom 189 parts of a distillate which contains 59.5 percent of butyl acrylate and 4 percent of acrylic acid as well as 11 parts of a pale yellow viscous oil.

Example 7

71 parts of isobutanol, 8.7 parts of water, 0.2 part of a 50 percent aqueous nickel bromide solution and 0.1 part of copper-(II)-bromide are treated in a shaking autoclave at 45 atmospheres pressure and at 190° C. with mixed gas for 12 hours. The reaction product (106 parts) is pale brown. By distillation in vacuo there are obtained therefrom 99 parts of a colorless distillate which contains 4.2 percent of acrylic acid and 52.6 percent of isobutyl acrylate besides 7 parts of a red-brown oily residue.

Example 8

A mixture of 73 parts of normal butanol, 6.7 parts of water, 0.2 part of a 50 percent nickel-2-bromide solution, 0.1 part of copper-(I)-iodide is treated with mixed gas for 12 hours as described in Example 7. 102 parts of a pale yellow product are obtained. By distillation there can be obtained therefrom 97 parts of a colorless distillate which contains 2.7 percent of acrylic acid and 43 percent of butyl acrylate, besides 5 parts of a brown oily residue. If the above procedure is followed with a mixture which contains the same catalyst components but 79.7 parts of normal butanol without the addition of water, there are obtained 81 parts of a dark brown product which contains only 3.6 percent of butyl acrylate.

This application is a continuation of application Serial No. 714,494, filed February 11, 1958, and now abandoned.

What we claim is:

1. In a process for the production of acrylic acid esters by the interaction of acetylene, carbon monoxide and lower alkanols at a temperature of between 100 and 250° C. and at a pressure of between 5 and 80 atmospheres, the improvement which comprises carrying out the reaction with an initial reaction medium of said lower alkanol containing from 4 to 12 percent by weight, with reference to the amount of the lower alkanol, of water, 0.1 to 1 percent by weight, with reference to the amount of the lower alkanol, of a catalyst consisting essentially of nickel ions and halogen ions, said halogen being selected from the group consisting of chlorine, bromine and iodine and 3 to 20 percent by weight, with reference to the amount of the catalyst of a heavy metal as activator, said heavy metal being selected from the group consisting of copper, mercury, zinc, cadmium, lead, and chomium, and in the absence of an inert organic solvent but in the presence of acrylic acid which is formed during the reaction from said water in the reaction medium.

2. In a process for the production of acrylic acid esters by the interaction of acetylene, carbon monoxide and lower alkanols at a temperature of between 100 and 250° C. and at a pressure of between 10 and 80 atmospheres, the improvement which comprises carrying out the reaction with an initial reaction medium of said lower alkanol containing from 4 to 12 percent by weight, with reference to the amount of the lower alkanol, of water, 0.01 to 1 percent by weight, with reference to the amount of the lower alkanol, of a nickel halide selected from the group consisting of nickel chloride, nickel bromide and nickel iodide and 3 to 20 percent by weight, with reference to the amount of the nickel halide, of a heavy metal compound as activator, said heavy metal being selected from the group consisting of copper, mercury, zinc, cadmium, lead, and chromium, and in the absence of an inert organic solvent but in the presence of acrylic acid which is formed during the reaction from said water in the reaction medium.

3. In a process for the production of acrylic acid esters by the interaction of acetylene, carbon monoxide and lower alkanols at a temperature of between 100 and 250° C. and at a pressure of between 10 and 80 atmospheres, the improvement which comprises carrying out the reaction with an initial reaction medium of said lower alkanol containing from 4 to 12 percent by weight, with reference to the amount of the lower alkanol, of water, 0.01 to 1 percent by weight, with reference to the amount of the lower alkanol, of a nickel halide selected from the group consisting of nickel chloride, nickel bromide and nickel iodide and 3 to 20 percent by weight, with reference to the amount of the nickel halide, of a copper compound as an activator, and in the absence of an inert organic solvent but in the presence of acrylic acid which is formed during the reaction from said water in the reaction medium.

4. In a process for the production of acrylic acid esters by the interaction of acetylene, carbon monoxide and lower alkanols at a temperature of between 100 and 250° C. and at a pressure of between 10 and 80 atmospheres, the improvement which comprises carrying out the reaction with an initial reaction medium of said lower alkanol containing from 4 to 12 percent by weight, with reference to the amount of the lower alkanol, of water, 0.01 to 1 percent by weight, with reference to the amount of the lower alkanol, of a nickel halide selected from the group consisting of nickel chloride, nickel bromide and nickel iodide and 3 to 20 percent by weight, with reference to the amount of the nickel halide, of a copper halide selected from the group consisting of copper chloride, copper bromide and copper iodide as activator, and in the absence of an inert organic solvent but in the presence of acrylic acid which is formed during the reaction from said water in the reaction medium.

5. In a process for the production of acrylic acid esters by the interaction of acetylene, carbon monoxide and lower alkanols at a temperature of between 100 and 250° C. and at a pressure of between 10 and 80 atmospheres, the improvement which comprises carrying out the reaction with an initial reaction medium of said lower alkanol containing from 4 to 12 percent by weight, with reference to the amount of the lower alkanol, of water, 0.01 to 1 percent by weight, with reference to the amount of the lower alkanol, of nickel-2-bromide and 3 to 20 percent by weight, with reference to the amount of nickel-2-bromide, of copper iodide as activator, and in the absence of an inert organic solvent but in the presence of acrylic acid which is formed during the reaction from said water in the reaction medium.

6. An improved process for the production of normal butyl acrylate by the interaction of acetylene, carbon monoxide and normal butanol at elevated temperature and at superatmospheric pressure in the absence of an inert organic solvent, which comprises carrying out the reaction in an initial reaction medium of said butanol containing 0.01 to 1 percent by weight, with reference to the amount of normal butanol, of nickel bromide and of 3 to 20 percent by weight, with reference to the amount of nickel bromide, of copper iodide, and of 4 to 12 percent by weight, with reference to the amount of normal butanol, of water from which acrylic acid is formed during the reaction.

7. An improved process for the production of ethyl acrylate by the interaction of acetylene, carbon monoxide and ethyl alcohol at elevated temperature and at superatmospheric pressure in the absence of an inert organic solvent, which comprises carrying out the reaction in an initial reaction medium of said ethyl alcohol containing 0.01 to 1 percent by weight, with reference to the amount of ethyl alcohol, of nickel-2-bromide and of 3 to 20 percent by weight, with reference to the amount of nickel-2-bromide, of copper bromide and of 4 to 12 percent by weight, with reference to the amount of normal butanol, of water from which acrylic acid is formed during the reaction.

8. In a process for the production of acrylic acid esters by the interaction of acetylene, carbon monoxide and a lower alkanol containing 1 to 4 carbon atoms at a temperature of between about 100 and 250° C. and a pressure between 5 and 80 atmospheres in the presence of minor amounts of a catalyst consisting essentially of nickel and halogen, said halogen being selected from the group consisting of chlorine, bromine and iodine, and in the presence of a heavy metal activator, said heavy metal being selected from the group consisting of copper, mercury, zinc, cadmium, lead, chromium, and the halides of said heavy metal compounds, the improvement which comprises carrying out the reaction substantially in the absence of an inert organic solvent but in the presence of about 4 to 22% of water, said water being converted during the process into acrylic acid in the reaction medium.

References Cited in the file of this patent

UNITED STATES PATENTS

| | | |
|---|---|---|
| 2,582,911 | Neher et al. | Jan. 15, 1952 |
| 2,883,418 | Reppe et al. | Apr. 21, 1959 |

FOREIGN PATENTS

| | | |
|---|---|---|
| 854,948 | Germany | Nov. 10, 1952 |
| 1,093,117 | France | May 2, 1955 |